(12) United States Patent
Mather et al.

(10) Patent No.: US 6,418,004 B1
(45) Date of Patent: Jul. 9, 2002

(54) SAFETY SYSTEM UTILIZING A PASSIVE SENSOR TO DETECT THE PRESENCE OF A HAND OF A WORKER AND PROVIDE A SIGNAL TO INTERRUPT THE OPERATION OF A MACHINE

(76) Inventors: Corey Alexander Mather, P.O. Box 2223; Mark William Gust, 210 Ruthven Street, both of Toowoomba (AU), 4350

( * ) Notice: Subject to any disclaimer, the term of this patent is extended or adjusted under 35 U.S.C. 154(b) by 0 days.

(21) Appl. No.: 09/453,095

(22) Filed: Dec. 2, 1999

(30) Foreign Application Priority Data

Dec. 2, 1998 (AU) .............................. PP 7439

(51) Int. Cl.[7] .............................................. H01H 47/00
(52) U.S. Cl. ........................ 361/179; 361/160; 361/186
(58) Field of Search ................................ 361/160, 179, 361/186; 342/42, 44, 50, 51; 241/34, 36, 37.5, 92

(56) References Cited

U.S. PATENT DOCUMENTS

| | | | | |
|---|---|---|---|---|
| 2,913,581 A | * | 11/1959 | Simonton et al. | .......... 250/83.6 |
| 3,989,198 A | * | 11/1976 | Blasko | |
| 4,057,805 A | | 11/1977 | Dowling | ...................... 343/225 |
| 5,227,798 A | * | 7/1993 | Hildebrand | ................... 342/51 |
| 5,287,113 A | * | 2/1994 | Meir | ............................ 342/51 |
| 5,667,152 A | * | 9/1997 | Mooring | ..................... 241/37.5 |
| 5,669,809 A | * | 9/1997 | Townsend | .................... 452/125 |
| 6,000,642 A | * | 12/1999 | Morey | .......................... 241/34 |

\* cited by examiner

*Primary Examiner*—Stephen W. Jackson
(74) *Attorney, Agent, or Firm*—Hoffman, Wasson & Gitler, PC

(57) ABSTRACT

A safety system for a machine such as a wood chipping machine. The safety system has a passive sensor that may be worn on the machine operator's wrist, a sensing coil mounted to a feed chute of the machine for detecting the proximity of the passive sensor, and control circuitry which is responsive to the sensing coil. The circuitry provides a control signal for use in stopping operation of the machine. In use, the presence of the operator's arm in the chute near to parts of the machine that can cause injury will trigger the sensing coil and cause the machine to cease operating, thus circumventing injury to the operator.

9 Claims, 5 Drawing Sheets

SAFETY SYSTEM UTILIZING A PASSIVE SENSOR TO DETECT THE PRESENCE OF A HAND OF A WORKER AND PROVIDE A SIGNAL TO INTERRUPT THE OPERATION OF A MACHINE

FIELD OF INVENTION

This invention relates to a safety system for machinery. In particular, the invention relates to safety equipment for a mobile wood chipping machine.

The invention will be described by way of example with reference to the use of the safety system with a mobile wood chipping machine. The system of the invention may be used with machines other than mobile wood chipping machines.

BACKGROUND OF THE INVENTION

Mobile wood chipping machines are used by workmen to chip branches and parts of trees into smaller pieces for providing mulch or to make the pieces of the tree more easily transportable to other locations or for easy disposal. Such machines have a feed chute leading into a chamber where chipping discs are present and the discs are driven to cause material introduced into the chamber to be shredded or chipped into small pieces. A pair of feed rollers are present at an end of the chute spaced from a feed opening into the chute. The feed rollers convey material placed into the chute towards the chipping discs. A safety bar extends across the chute in the vicinity of the feed opening and the bar is normally pulled away from the chute to cause a drive to rotate the feed rollers and is pushed towards the chute to disengage the drive. Serious accidents have been known to occur with the use of such machines. It is usual for workmen to wear gloves and other protective clothing, and it is possible that a workman may become snared by the material being fed into the chute in which case the workman may be unable to operate the safety bar in time or may be unable to operate the bar at all and as a consequence may be drawn into the machine and injured. Furthermore, the safety bar may malfunction.

SUMMARY OF THE INVENTION

It is an object of the present invention to provide a safety system for machinery which at least minimizes the disadvantages referred to above.

According to one aspect of the invention there is provided a safety system for a machine, the system having at least one passive sensor, a sensing coil associated with the machine for detecting proximity of the passive sensor and control circuitry responsive to the sensing coil for providing a control signal for use in stopping operation of the machine.

The passive sensor may consist of a tuned circuit. Preferably the tuned circuit consists of a coil and a capacitor connected in parallel with one another. The coil may have any suitable number of turns and the turns may be wound in a spiral to present a helical or a substantially flat-shaped circular coil. The passive sensor may be incorporated in a band normally worn or carried by the machine operator. Preferably, the band is placed around a part of the machine operator's body which might be brought into proximity to the machine. The band may be worn on the wrist of the machine operator. The operator may carry or wear more than one passive sensor.

The sensing coil may be configured as a spiral or as a number of turns of wire with a non-circular path.

The sensing coil may be placed adjacent or incorporated into the machine being used by the operator. The sensing coil may be placed adjacent those parts of the machine which are able to injure the operator. Where the system of the invention is used with a wood chipping machine, the sensing coil may be mounted to the feed chute of the machine. If necessary, the sensing coil may be insulated from the chute. The sensing coil is energised by the control circuitry and the electromagnetic field provides a control output which may then be used to cause the machine with which the safety system is associated to cease operating.

BRIEF DESCRIPTION OF THE DRAWINGS

A particular preferred embodiment of the invention will now be described by way of example with reference to the drawings in which.

DETAILED DESCRIPTION OF THE PREFERRED EMBODIMENT

Figure 1:
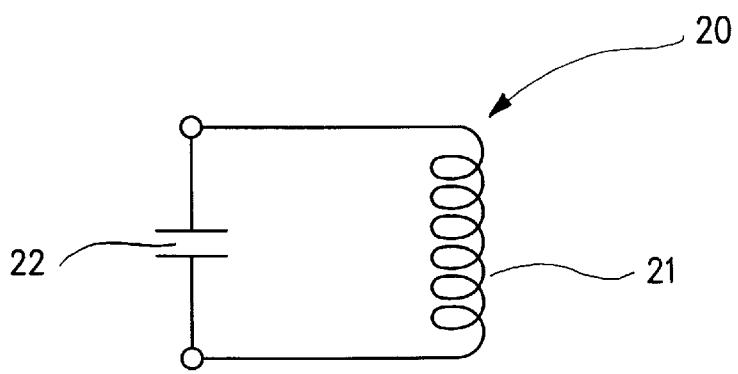
FIG. 1 is a circuit diagram of a passive sensor according to an embodiment of the invention.

FIG. 1 shows an example of a passive sensor 20. The sensor comprises a tuned circuit consisting of a coil 21 and a capacitor 22 connected in parallel with the coil. The coil may have any suitable number of turns and it is preferred that the coil be wound in a spiral fashion so that it presents a substantially flat circular profile. The sensor may be incorporated in a wrist band and two such bands may be worn by the machine operator so that the presence of either hand of the operator within a predetermined distance form the machine may be detected. Of course the sensors need not be incorporated into a band and may be worn or otherwise carried by the operator.

Figure 2:
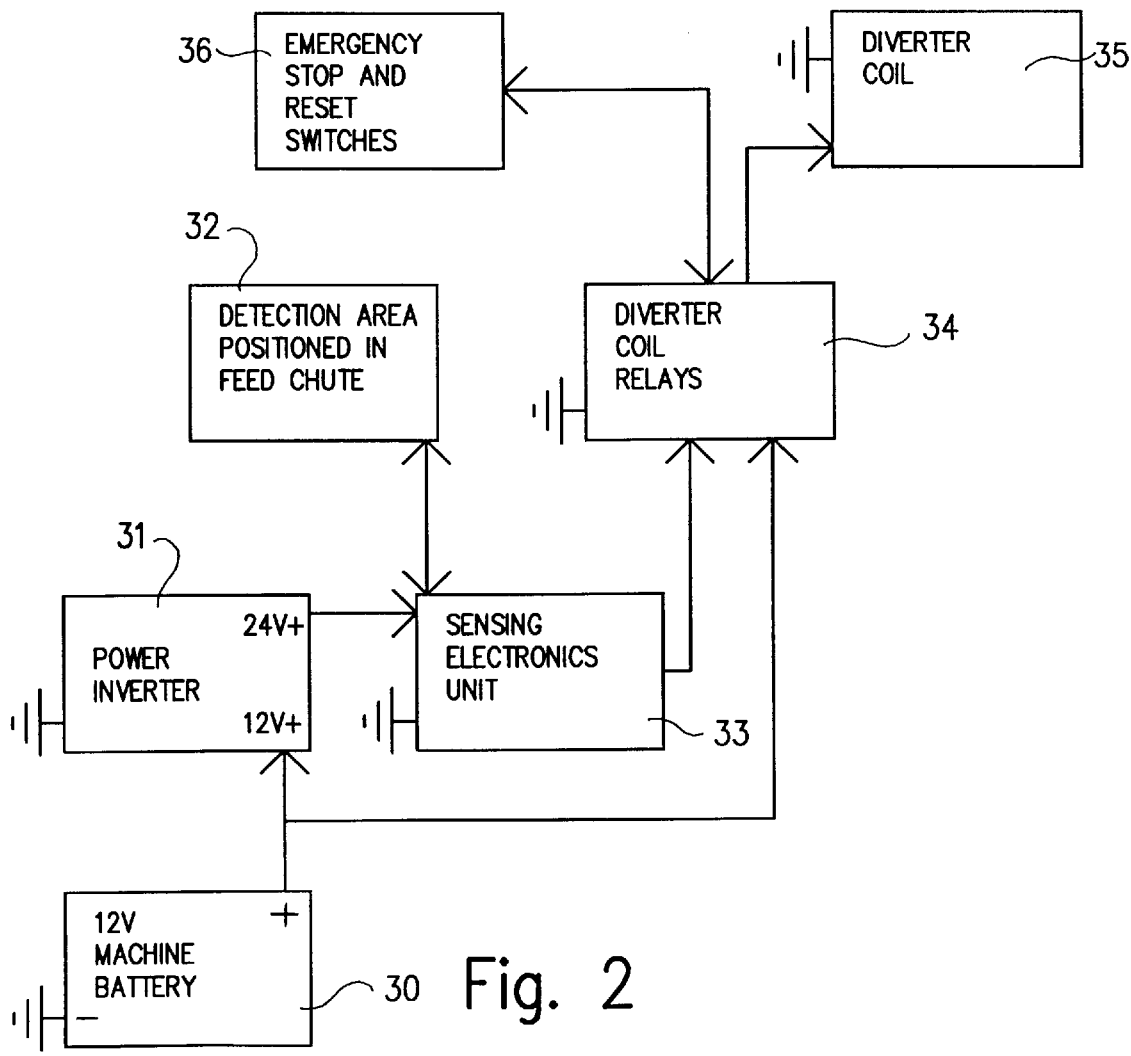
FIG. 2 is a block diagram of part of the safety system of the invention.

FIG. 2 shows a block diagram of part of the safety system of the invention. The block diagram shows a battery 30 which may typically be a battery associated with a wood chipping machine 9 (see FIGS. 6 and 7) to which the safety system of the invention may be fitted. A DC to DC converter 31 receives power from the battery 30 and provides a 24 VDC output for the remainder of the circuit shown in the figure.

A sensor coil 32, which comprises a coil configured in a flat rectangular shape, is located in a feed chute 10 of the wood chipping machine 9 (see FIGS. 6 and 7), and, as shown in FIG. 2, is coupled to sensing electronics unit 33. An output from electronics unit 33 is used to operate a relay 34. Relay 34 in turn allows a diverter coil 35 of the solenoid valve to be operated. This solenoid valve is part of the hydraulic circuit shown in FIG. 3. Stop and reset switches 36 are coupled to the relay 34.

Figure 6:
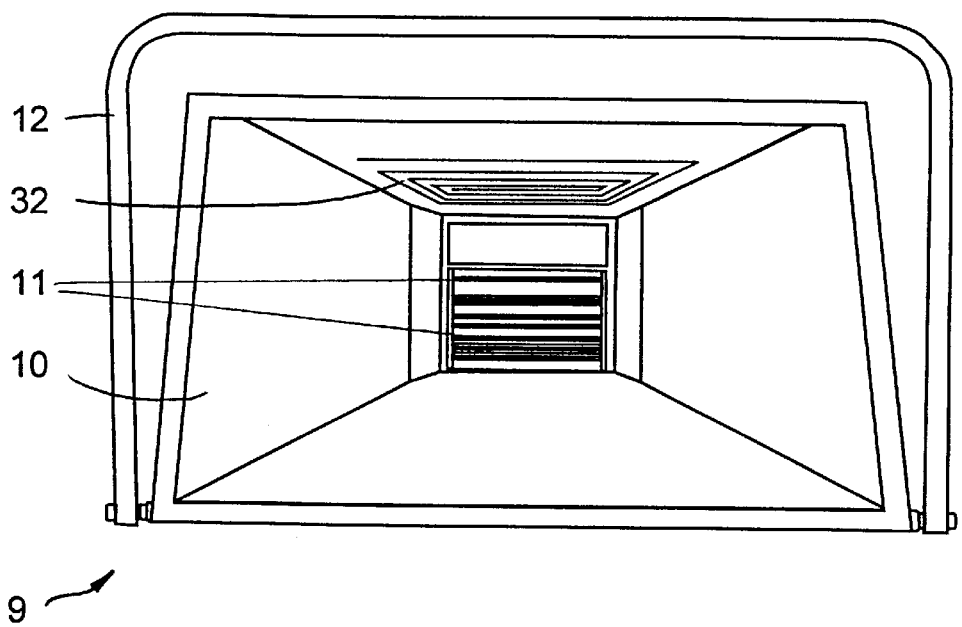
FIG. 6 is a front elevational view of a feed chute and feed rollers of a wood chipping machine with a mounted sensing coil, according to an embodiment of the invention.
Figure 7:
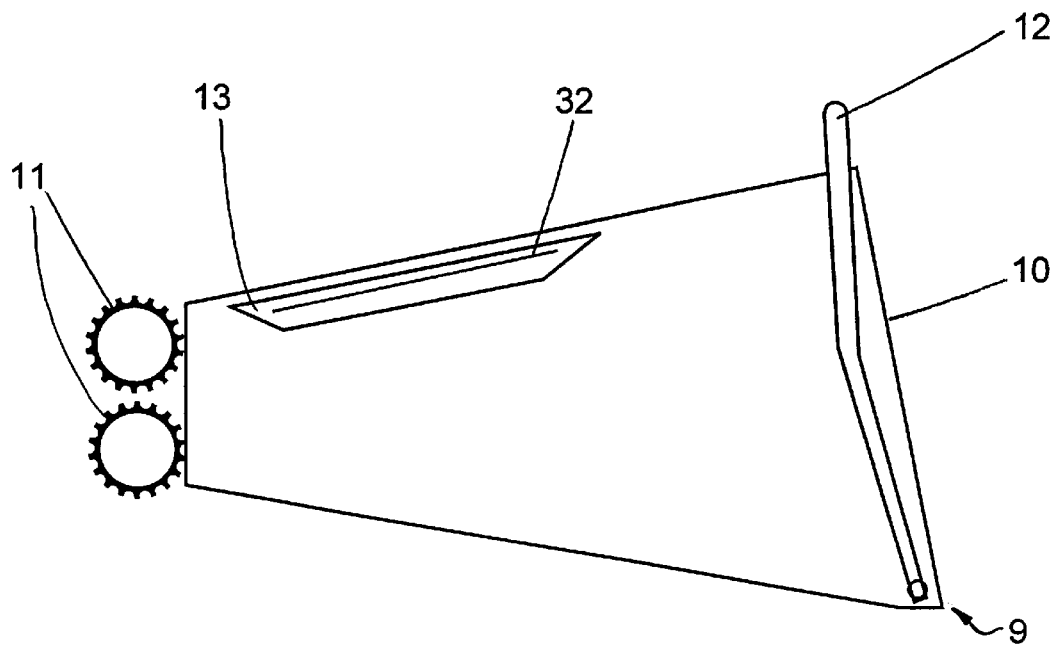
FIG. 7 is a side elevational view of the wood chipping machine and mounted sensing coil of FIG. 6.

FIGS. 6 and 7 show the feed chute 10, two feed rollers 11 and a safety bar 12 of the wood chipping machine 9. The feed rollers 11 control the feeding of branches or the like into the chipping blades of the machine 9. The sensing coil 32 is embedded in a truncated pyramid-shaped insulator matrix 13. The insulator matrix 13 mounts the sensing coil 32 to a wall of the chute 10 and insulates the sensing coil 32 from the wall of the chute 10.

Figure 3:
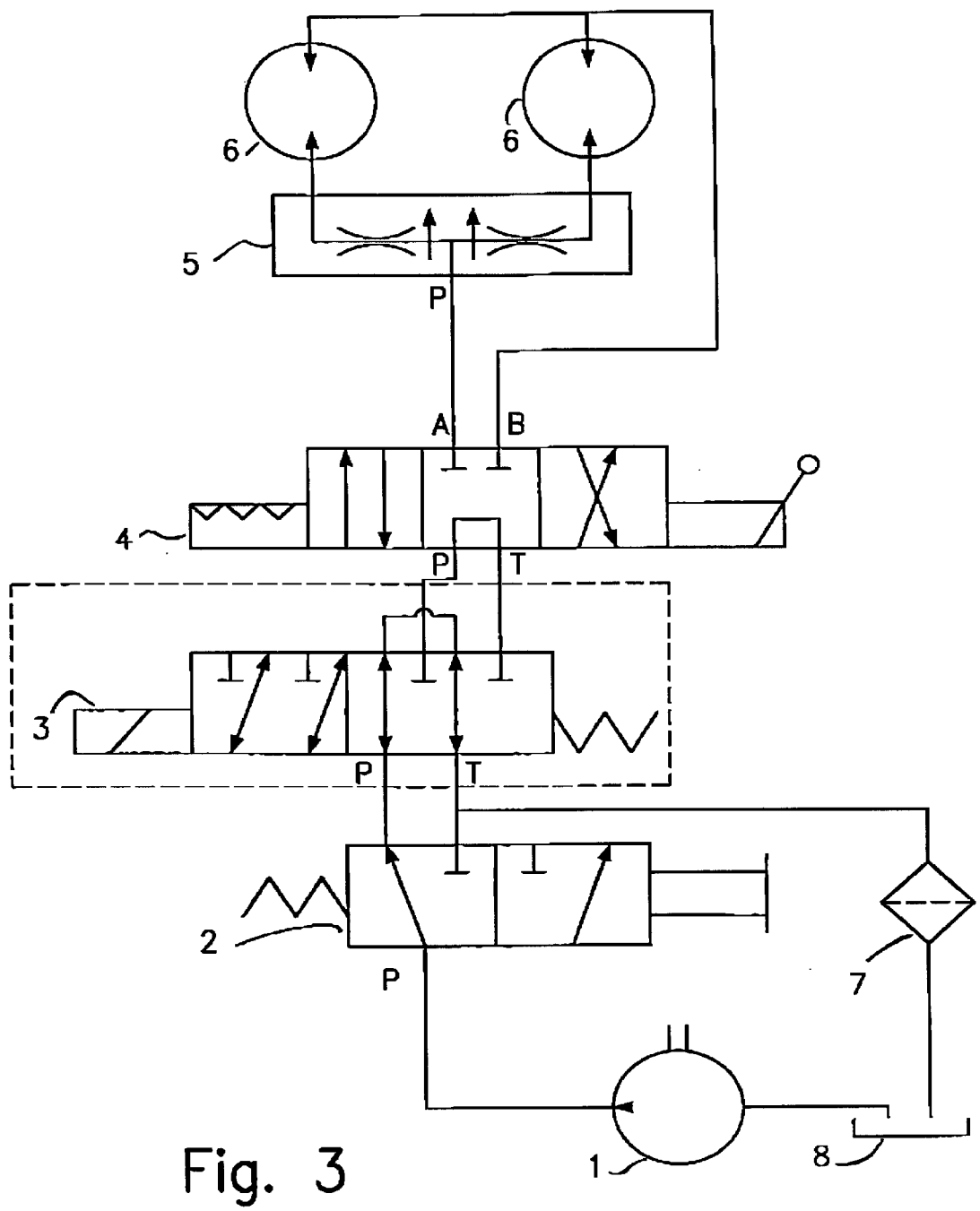
FIG. 3 is an hydraulic circuit diagram of a typical hydraulic circuit employed in a wood chipping machine.

FIG. 3 shows a hydraulic pump 1, and a reservoir 8 for hydraulic fluid is coupled to the pump. Feed valve 2, when in the position shown, allows the pump 1 to supply fluid to safety diverter solenoid valve 3. The valve 2 may be moved to its other position, in which case fluid from the pump is diverted to a return filter 7 and then fed back into the reservoir 8.

Valve 3 includes a coil which, when energised, moves the valve from the position shown to its second position. In the position shown, fluid passes through valve 3 and is returned to the filter 7 and then to the reservoir 8 because the manual feed roller directional valve 4 is in its intermediate position.

The solenoid valve 3 is normally in the position shown when its associated coil is de-energised.

Feed roller directional valve 4 is manually operable and may be moved either to the left or to the right of its intermediate position. When valve 4 is moved to its left hand position, fluid may be supplied to flow divider/combiner 5 and by that device to feed roller hydraulic motors 6 to cause the motors to drive the feed rollers 11 in a first direction. When the valve 4 is moved into its right hand position, fluid may be supplied to the motors 6 via flow divider/combiner 5 to cause the rollers 11 to be driven in a direction opposite the first direction.

The safety solenoid valve 3 is normally energised and is de-energised whenever the hands of machine operator are detected close to an area within the feed chute 10 of the chipping machine 9. When valve 3 is de-energised, it returns to the position shown in FIG. 3 and motors 6 no longer rotate and the feed rollers 11 cease their rotation.

Figure 4:
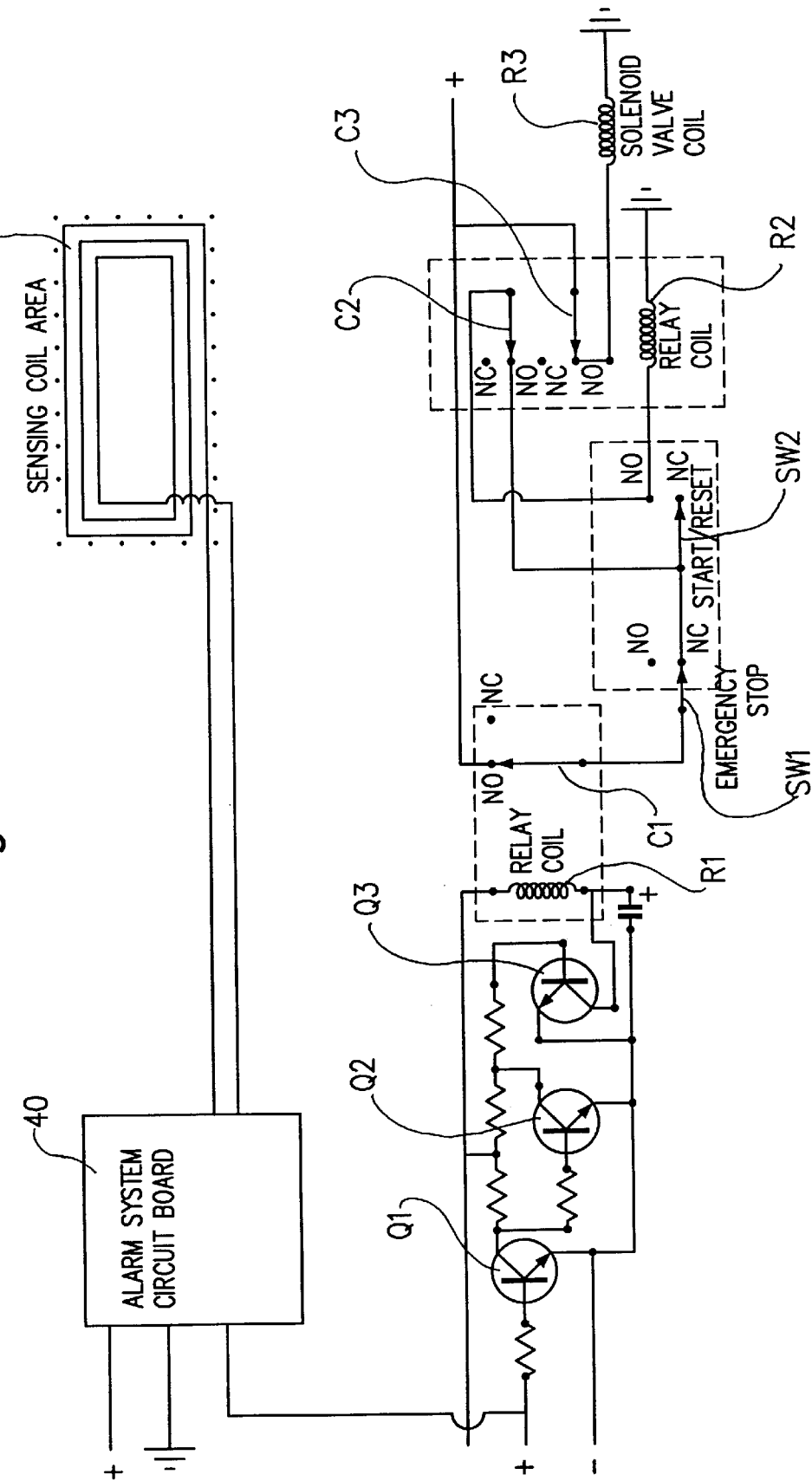
FIG. 4 is a circuit diagram showing further detail of part of the safety system of the invention.

FIG. 4 shows further details of the safety system of the invention. Alarm circuit 40 has the sensing coil 32 coupled to it. Coil 32 is positioned extending in a plane along the wall of the feed chute 10. The passive sensor coils worn by the machine operator function to modify the electromagnetic field produced by coil 32 whenever the passive sensor coils are close enough to the coil 32. This modification of the field of coil 32 is sensed by circuit 40 which provides an output as a consequence of this sensed proximity. That output is used to drive a switching circuit consisting of transistors Q1, Q2 and Q3 and a relay having a coil R1 and a contact C1. With relay R1 de-energised, contact C1 is in the position shown.

An emergency stop switch SW1 is present in series with contact C1 and switch SW1 is normally closed.

A second relay has a coil R1 and two contacts C2 and C3. Contacts C2 and C3 are in the positions shown when relay coil R2 is energised. Coil R3 is the coil of solenoid valve 3 in FIG. 3. With FIG. 4 in the state shown coil R3 is energised and the valve in its left hand position.

When coil 32 detects the proximity of a passive sensor coil, R1 is de-energised and contact C1 moves to its normally closed position. This de-energises coil R2, and contacts C2 and C3 move to normally closed positions and coil R3 is de-energised.

A start/reset switch SW2 is in series with emergency switch SW1. Once the passive sensors move away from coil 32, coil R1 is energised and contact C1 returns to the position shown in FIG. 4. Coil R2 is de-energised and contacts C2 and C3 are in the opposite (NC) positions to that shown in the figure and coil R3 is de-energised and the motors 6 (in FIG. 3) which drive the feed rollers 11 are not operating.

The start switch SW2 is momentarily moved to the position opposite to that shown in FIG. 4, and thus allows coil R2 to be energised to move contacts C2 and C3 into the positions shown. The coil R3 is then energised and switch SW2 is released and returns to the position shown. Coil R2 is held in and coil R3 remains energised until coil 32 once again detects the proximity of a passive sensor.

Figure 5:
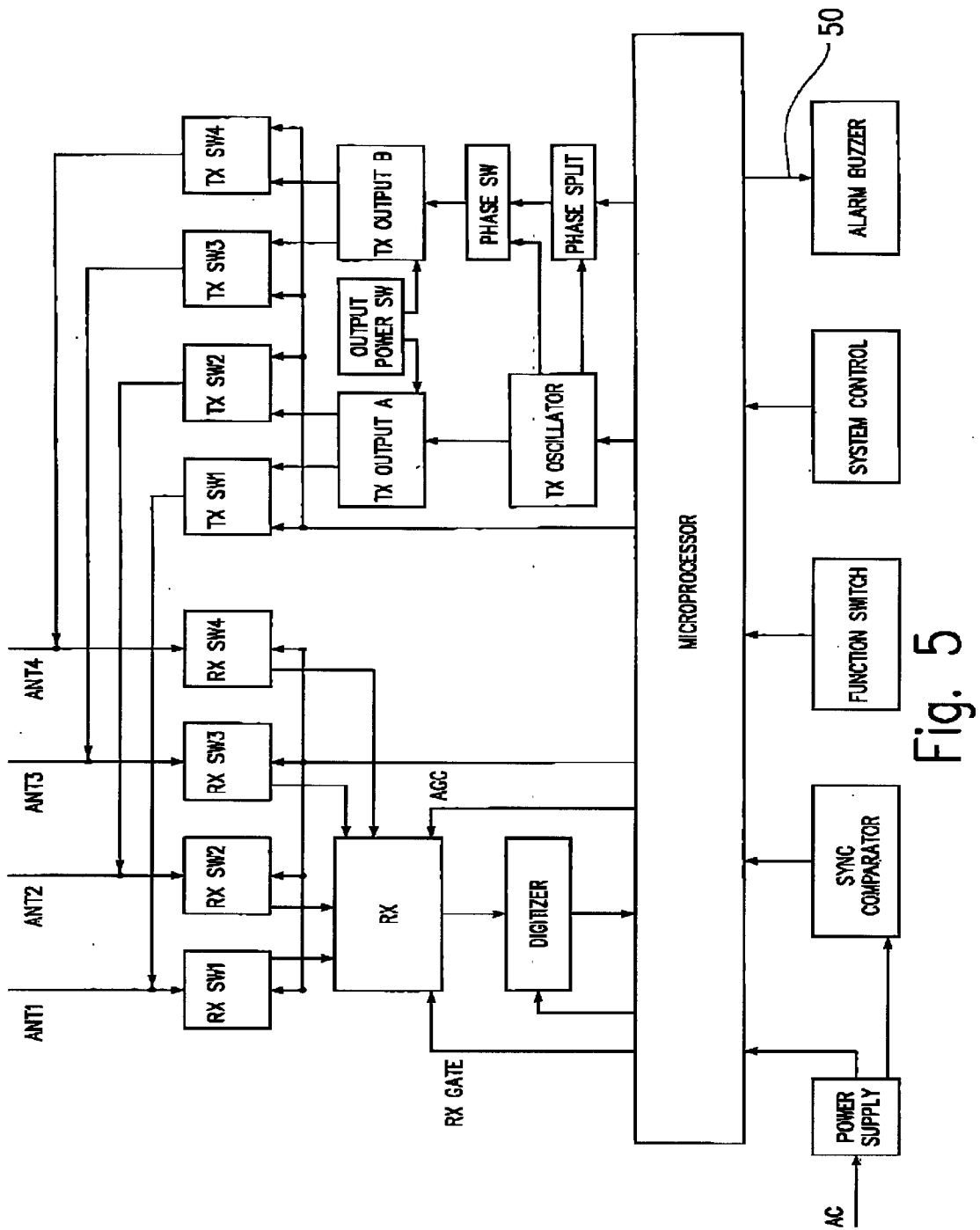
FIG. 5 is a detailed block diagram of a control circuit for the system shown in FIG. 4.

FIG. 5 shows a detailed circuit block diagram of a control circuit for the system of the invention. The circuit has four inputs, ANT1, ANT2, ANT3 and ANT4 and only one of these is used. Coil 32 (FIG. 4) has one of its ends connected to input ANT1 and its other end is connected to ground. The circuit of FIG. 5 energises the coil 32 and also monitors that coil to detect field changes in that coil produced by the proximity of a passive sensor. An output at line 50 may be used to operate an alarm and is the output supplied to transistor Q1 in FIG. 4.

The control circuit illustrated in FIG. 5 also includes a microprocessor 51, power supply 52, sync comparators 53, function switch 54, system control 55, alarm buzzer 56, digitizer 57, receiver 58, receive switches 59 to 62, transmitter oscillator 63, phase splitter 64, phase switch 65, first transmitter 66, second transmitter 67, output switch 68, and transmitter switches 69 to 72.

The use of passive sensors like that shown in FIG. 1 means that no power supply need be carried by the machine operator. As the passive sensors do not require power, their function is not dependent on the presence of a power supply to them and thus give rise to operational advantages.

The invention has been described by way of example with reference to its use with a wood chipping machine 9. In that example application solenoid valve 3 in FIG. 3 is necessary to ensure that drive to the feed rollers 11 is discontinued.

If the system of the invention were used with equipment other than the wood chipping machine 9, a coil like coil 32, passive sensors and other components would still be necessary but a solenoid valve 3 would not. The system of the invention would be used to control some other device to achieve activation and deactivation of the equipment being controlled.

What is claimed is:

1. A wood chipping machine comprising a safety system, said wood chipping machine including:
   chipping blades that rotate to chip material delivered to the machine;
   a feed rollers that grip and feed the material to the chipping blades;
   a feed chute that guides material to the feed rollers, the feed chute having walls defining a passage, an open front end for receiving the material and an open rear end adjacent the feed rollers; and
   a motor that drives the feed rollers and the chipping blades;
said safety system comprising:
   at least one passive sensor incorporated in a band worn by a user of the wood chipping machine;
   at least one sensing coil mounted on one of the walls of the chute, the sensing coil generating a signal when the passive sensor is in the passage; and
   means for stopping the chipping blades and/or the feed rollers in response to the signal.

2. The wood chipping machine of claim 1 wherein the at least one passive sensor consists of a tuned circuit.

3. The wood chipping machine of claim 2 wherein the tuned circuit consists of a coil and a capacitor connected in parallel with one another.

4. The wood chipping machine of claim 3 wherein the coil has a number of turns that are wound in a spiral to present a substantially flat shaped circular coil.

5. The wood chipping machine of claim 1 wherein the band is placed around a part of the user's body which is brought into proximity to the machine.

6. The wood chipping machine of claim 5 wherein the band is worn on the wrist of the user.

7. The wood chipping machine of claim 1 wherein the sensing coil is energized by control circuitry and an electromagnetic field generated by the at least one sensing coil is modified by the close proximity of the passive sensor, and the control circuitry, in response to the detection of modification of the field, provides a control output which then causes the wood chipping machine to cease operating.

8. The wood chipping machine of claim 1 wherein the at least one sensing coil is insulated from the feed chute.

9. The wood chipping machine of claim 1 wherein the at least one sensing coil is configured in a flat rectangular shape.

* * * * *